United States Patent [19]

Suzuki et al.

[11] 4,125,025
[45] Nov. 14, 1978

[54] INSTRUMENT FOR MEASURING THE AMPLITUDE OF VIBRATION OF A VIBRATING OBJECT

[75] Inventors: Masane Suzuki; Kiyoshi Suzuki; Kenji Yasuda, all of Omiya, Japan

[73] Assignee: Fuji Photo Optical Co., Ltd., Omiya, Japan

[21] Appl. No.: 761,326

[22] Filed: Jan. 21, 1977

[30] Foreign Application Priority Data

Jan. 21, 1976 [JP] Japan .................................. 51-5543

[51] Int. Cl.² .............................................. G01H 9/00
[52] U.S. Cl. ........................................ 73/655; 356/374
[58] Field of Search ........................ 73/71.3, 655–657; 356/109, 111, 169

[56] References Cited

U.S. PATENT DOCUMENTS 3,245,307  4/1966  Lang ..................... 356/169

FOREIGN PATENT DOCUMENTS 1,221,535   2/1971  United Kingdom ..................... 73/71.3
1,377,611  12/1974  United Kingdom ..................... 73/71.3

*Primary Examiner*—James J. Gill
*Attorney, Agent, or Firm*—Harold L. Stults; Pasquale A. Razzano

[57] ABSTRACT

An instrument for measuring the amplitude of vibration of a vibrating object consists of a first optical system for periodically projecting the image of a grating onto the vibrating object and second optical system having an optical axis intersecting that of the first optical system in the vicinity of the object, for sharing the image projected on and reflected from the object and recording the shared image on a photographic film. The measurement of the amplitude is obtained in the form of a moire pattern.

8 Claims, 6 Drawing Figures

INSTRUMENT FOR MEASURING THE AMPLITUDE OF VIBRATION OF A VIBRATING OBJECT

BACKGROUND OF THE INVENTION

1. Field of the Invention

This invention relates to an instrument for measuring the amplitude of vibration of a vibrating object, and more particularly to an instrument for measuring the amplitude of vibration of a vibrating object wherein the amplitude of vibration is measured by means of a moire pattern.

2. Description of the Prior Art

The main methods heretofore proposed for measuring the amplitude of vibration of a vibrating object are the holographic interferometric method, the speckle interferometric method, the moire method and the dot-pattern method. Of these, the dot-pattern method has the widest range of measurement applications. This method is, however, disadvantageous is that it does not permit simple numerical evaluation of vibration amplitude and that post-measurement processing tends to be complex. The other methods, although they provide an easily readable indication of the description of vibration amplitude in the form of contour lines, are severely limited in the range of vibration amplitudes which they are capable of measuring, the holographic interferometric method being limited to the range of from about $0.1\mu$ to $10\mu$, the speckle interferometric method to the range of from $1\mu$ to $100\mu$ and the moire method to measurement of vibration amplitude of 1mm and over. Thus no existing method of measurement is responsive to amplitudes on the order of $100\mu$.

SUMMARY OF THE INVENTION

In view of the problems inherent in prior arts, one object of the present invention is to provide an instrument for measuring the amplitude of vibration of a vibrating object by use of the moire method.

Another object of the present invention is to provide an instrument for measuring the amplitude of vibration of a vibrating object which is freely and easily adjustable in the range of vibration amplitudes which it is capable of measuring.

Still another object of the present invention is to provide an instrument for measuring the amplitude of vibration of an object which is capable of measuring the amplitude with a high degree of sensitivity.

In accordance with the present invention there is provided an instrument for measuring the amplitude of vibration of a vibrating object in which a first optical system for projecting the image of a grating onto the object whose vibration is being measured, and a second optical system for sharing the image projected on and reflected from said object and recording the sharing image on a photographic film, the optical axes of said first and second optical systems intersecting in the vicinity of said object to make a desired angle therebetween. The first optical system includes a stroboscope which is synchronized with the vibration of the object to flash when the amplitude of vibration of the object is at is maximum positive and negative values. The second optical system includes means for sharing or laterally shifting the image projected on and reflected from the object such as a grating, a plurality of mirrors or a prism.

DESCRIPTION OF THE PREFERRED EMBODIMENTS

Figure 1:
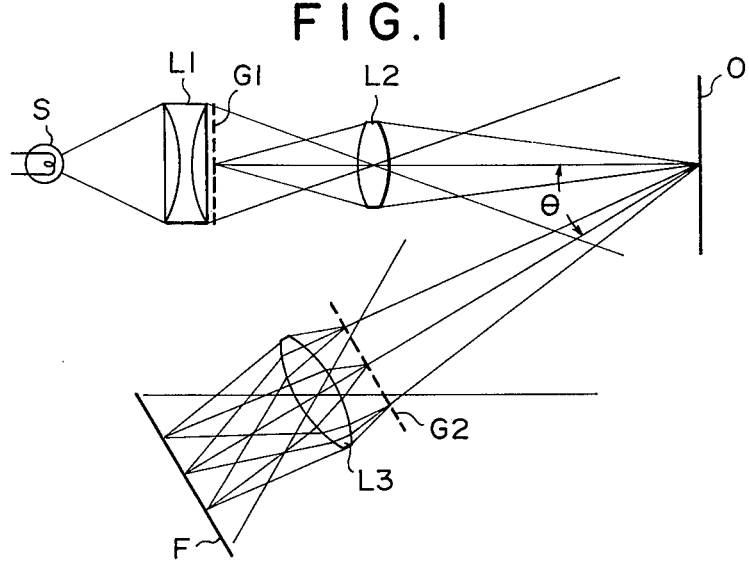
FIG. 1 is a schematic view of the optical arrangement used in one embodiment of the present invention.

The present invention will be described in more detail with reference to the accompanying drawing. FIG. 1 is a schematic view showing the optical arrangement employed in one embodiment of this invention. A stroboscope S, a condenser L1, a grating G1 and a projecting lens L2 constitute a first optical system for projecting the image of the grating G1 onto an object O. A sharing grating G2 and a focusing lens L3 constitute a second optical system for sharing an image reflected from the object O and focusing the shared image on the photosensitive surface of a photographic film F. The first and second optical systems are so positioned that the optical axis of the first optical system intersects that of the second optical system at an angle of $\theta$ at a point on the surface of the object O when the object O is in resting state.

The light periodically emitted by the stroboscope S passes through the condenser L1, the grating G1 and the projection lens L2 to fall on the object O which is subjected to forced vibration by a vibrating means not shown. A part of the light reflected by the object O passes through the sharing grating G2 and the focusing lens L3 to impinge on the photographic film F.

Assume now that the stroboscope S flashes at a frequency which is twice as high as that of the vibration of the vibrating object O and that these flashes occur one at the top and one at the bottom of each vibration cycle, that is when the vibration amplitude is at its maximum positive and negative values.

Figure 2:
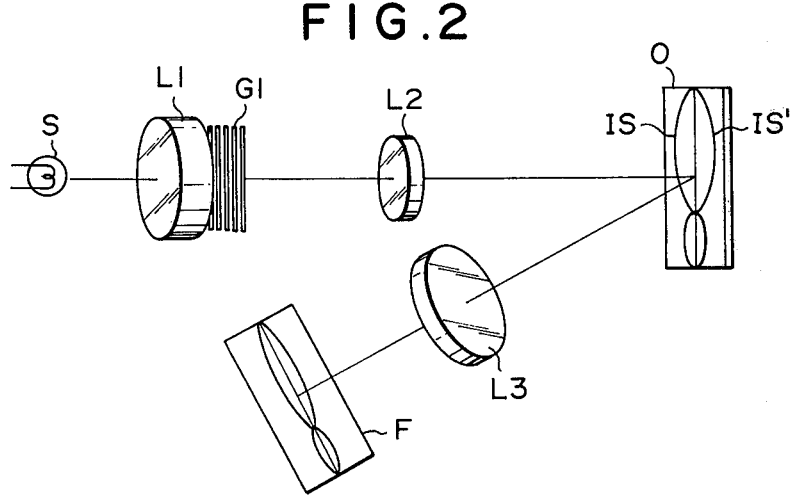
FIG. 2 is a diagram used to facilitate the explanation of the embodiment shown in FIG. 1.

Now for convenience in explanation, first consider the above-described arrangement less the sharing grating G2. (See FIG. 2.) Assuming that the object O is a flat sheet subjected to simple sine wave vibration and considering the light passing through only a single slit of the grating G1 as typical of the light passing through all such slits, it will be understood that the image of this single slit will appear alternately at Is and Is' and that these images will in turn be focused on the film F by the focusing lens L3.

Figure 3:
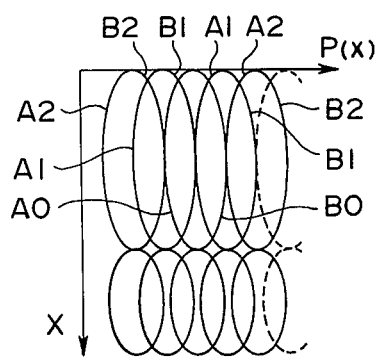
FIG. 3 is a graphic view depicting the image of the grating as it appears on the surface of the film in the embodiment shown in FIG. 1, and FIG. 4A, 4B and 4C are explanatory views showing various sharing means which can be employed in the present invention.

If the sharing grating G2 is placed between the object O and the focusing lens L3 as shown in FIG. 1, the image produced by the grating G1 will be shared or shifted laterally by the sharing grating G2 so that the image recorded on the film F will consist of a large number of grating images overlapping to produce moire pattern as shown in FIG. 3.

This will now be analyzed mathematically. Taking the constant determined by the magnification of the focusing lens L3 and the angle $\theta$ to be $M\theta$, the configuration of the object O to be $S(x)$ and the amplitude of vibration thereof to be $A(x)$, then the image of the grating at the time $t$, namely $P(x, t)$, can be expressed as follows:

$$P(x, t) = M\theta [S(x) + A(x)\cos\{\omega t + \omega(x)\}]$$

Now since the stroboscope is synchronized with the vibration of the object O to flash when the amplitude of vibration of the object O is at its maximum positive and negative values, the configurations of the two images formed by an given slit of the grating, namely the configurations P1(x) and P2(x), can be expressed as follows:

$$P1(x) = M\theta \{S(x) + A(x)\},$$

$$P2(x) = M\theta \{S(x) - A(x)\}$$

where $n$ and $m$ are the sharing factors, namely the shifted distances.

The moire fringe is produced at the point of intersection where the following condition is satisfied:

$$P1n(x) - P2m(x) = 0$$

The amplitude of vibration of the object O at the portion thereof corresponding to the moire fringe, that is $Anm(x)$, can be expressed as $(m-n)/2M\theta$.

The moire fringe is therefore a contour line corresponding to points on the object O having equal amplitude of vibration.

The sharing or lateral shifting accomplished diffractionally by the sharing grating described in connection with the embodiment of the invention shown in FIG. 1 can also be accomplished by use of a plurality of mirrors or a prism. In such cases, the sharing means transmits a part of the light from the object O straight and deflects another part of the light into directions different at equal angular intervals, or transmits a part of the light straight and laterally shifts another part of the light up to different positions spaced at equal intervals.

Figure 4A:
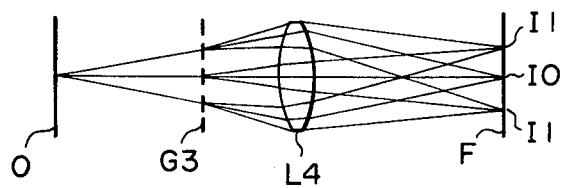
Figure 4B:
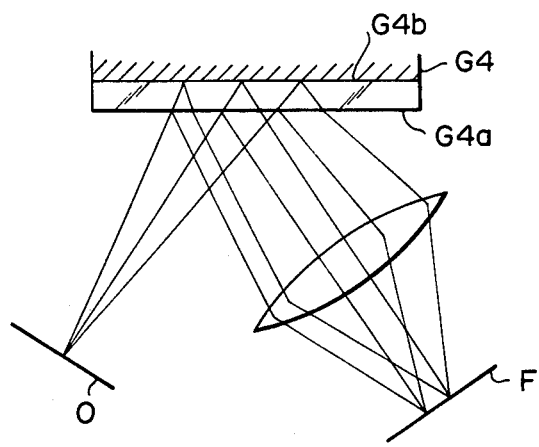
Figure 4C:
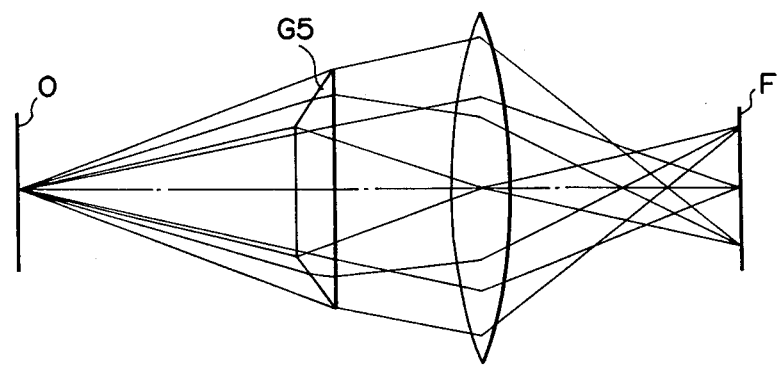

FIGS. 4A, 4B and 4C are explanatory figures showing the principal involved in each of the sharing methods discussed above. FIG. 4A shows a diffractional sharing effected by use of a grating. That portion of the light refracted by the object O which passes through the grating G3 along the optical axis thereof and is focused by the lens L4 to form image I0 is, as a consequence of being diffracted by the grating G3, focused to form images I1, I2, ... (FIG. 4A shows only image I1) which constitute the shared image. The image I0 consists of the images A0 and B0 (See FIG. 2) produced at the maximum positive and negative amplitudes of vibration of the vibrating object O, and the image I1 similarly consists of the images A1 and B1. The same rule applies correspondingly to the following examples of the sharing means. FIG. 4B shows a sharing by means of mirrors. In the arrangement, there is provided a plane mirror G4 and sharing results from the interference occurring between the images reflected by the flat, parallel top and bottom reflective surfaces G4a, G4b of said plate mirror G4. FIG. 4C shows a sharing by means of a prism. In this arrangement a prism G5 having a multiplicity of parallel planes of incidence such as a mirage lens is used to obtain the sharing effect.

In the instrument for measuring the amplitude of vibration of an object in accordance with this invention, the measurement sensitivity with respect to vibration amplitude is a function of exposure time and of the product of the sharing factor and a constant determined by the system structure. Thus, this instrument is capable of measuring the vibration of an object regardless of its shape and can be freely and easily adjusted in its measuring sensitivity by variation of the sharing factor. This means that the degree of sensitivity is limited only by the sharing means employed and that by appropriate selection of the sharing means it is possible to carry out measurement of vibration amplitude with a high degree of sensitivity.

We claim:

1. An instrument for measuring the amplitude of vibration of a vibrating object comprises a first optical system including a light source and a grating for periodically projecting the image of the grating onto a vibrating object, and a second system including means for laterally shifting the image of the grating projected on and reflected from the vibrating object and focusing means for focusing the shifted image on a photographic film, the optical axes of said first and second optical systems intersecting in the vicinity of the surface of said vibrating object, whereby the measurement of the vibration of the vibrating object is obtained in the form of a moire pattern; said periodic projection of the image of said grating being synchronized with the vibration of the object to occur at a frequency which is twice as high as that of the vibration of the vibrating object.

2. An instrument for measuring the amplitude of vibration of a vibrating object as defined in claim 1 wherein said light source comprises a stroboscope and said first optical system includes a condenser and projecting lens with the stroboscope, condenser, grating, and projecting lens arranged in this order along the optical axis of the projecting lens.

3. An instrument for measuring the amplitude of vibration of a vibrating object as defined in claim 1 wherein said lateral shifting means is a grating.

4. An instrument for measuring the amplitude of vibration of a vibrating object as defined in claim 1 wherein said periodic projection of the image of said grating is synchronized with the vibration of the object to occur at the point of maximum positive and maximum negative amplitude of each cycle of vibration of said vibrating object.

5. An instrument for measuring the amplitude of vibration of a vibrating object as defined in claim 1 wherein said laterally shifting means is a prism.

6. An instrument for measuring the amplitude of vibration of a vibrating object as defined in claim 1 wherein said laterally shifting means is a mirror having flat and parallel top and bottom reflector surfaces.

7. An instrument for measuring the amplitude of vibration of a vibrating object comprises a first optical system including a light source and a grating for periodically projecting the image of the grating onto a vibrating object, and a second optical system including means for laterally shifting the image of the grating projected on and reflected from the vibrating object and focusing means for focusing the shifted image on a photographic film, the optical axes of said first and second optical system intersecting in the vicinity of the surface of said vibrating object, whereby the measurement of the vibration of the vibrating object is obtained in the form of a moire pattern; said laterally shifting means comprising a prism.

8. An instrument for measuring the amplitude of vibration of a vibrating object comprises a flat optical system including a light source and a grating for periodically projecting the image of the grating onto a vibrating object, and a second optical system including means for laterally shifting the image of the grating projected on and reflected from the vibrating object and focusing means for focusing the shifted image on a photographic film, the optical axes of said first and second optical systems intersecting in the vicinity of the surface of said vibrating object, whereby the measurement of the vibration of the vibrating object is obtained in the form of a moire pattern; said laterally shifting means being a mirror having flat and parallel top and bottom reflective surfaces.

* * * * *

UNITED STATES PATENT AND TRADEMARK OFFICE
CERTIFICATE OF CORRECTION

PATENT NO. : 4,125,025
DATED : November 14, 1978
INVENTOR(S) : Mesane Suzuki; Kiyoshi Suzuki and Kenji Yasuda It is certified that error appears in the above-identified patent and that said Letters Patent are hereby corrected as shown below:

Claim 1, (column 4, line 11) - after "second" insert

---optical---;

Claim 8, (column 4, line 63) - change "flat" to ---first---.

Signed and Sealed this

Thirteenth Day of February 1979

[SEAL]

Attest:

RUTH C. MASON
Attesting Officer

DONALD W. BANNER
Commissioner of Patents and Trademarks